United States Patent
Cook

(10) Patent No.: US 9,552,611 B2
(45) Date of Patent: Jan. 24, 2017

(54) SYSTEMS AND METHODS FOR MODIFYING RESOURCES TO MANAGE LOSS EVENTS

(71) Applicant: STATE FARM MUTUAL AUTOMOBILE INSURANCE COMPANY, Bloomington, IL (US)

(72) Inventor: Michael K. Cook, Carlock, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 128 days.

(21) Appl. No.: 14/094,049

(22) Filed: Dec. 2, 2013

(65) Prior Publication Data
US 2015/0154709 A1 Jun. 4, 2015

(51) Int. Cl.
*G06Q 40/00* (2012.01)
*G06Q 40/08* (2012.01)
(Continued)

(52) U.S. Cl.
CPC ........ *G06Q 40/08* (2013.01); *G06Q 10/06315* (2013.01); *G06F 17/30377* (2013.01);
(Continued)

(58) Field of Classification Search
CPC .............. G06Q 40/08; G06Q 10/06315; G06Q 30/0283; G06Q 10/06; G06Q 10/0633; G06Q 30/0281; G06Q 30/0603; G06F 17/30566; G06F 17/30377
(Continued)

(56) References Cited

U.S. PATENT DOCUMENTS 6,678,684 B1 * 1/2004 Koga ..................... G06Q 40/08
6,687,640 B1 * 2/2004 Gelbard ................. F24F 11/006
454/229
(Continued)

OTHER PUBLICATIONS

Objectivity enhances leading object-oriented data management platform improving data ingest and access performance capabilities. (Dec. 13, 2006). Business Wire Retrieved from http://dialog.proquest.com/professional/docview/671536458?accountid=142257 on Oct. 27, 2016.*
(Continued)

*Primary Examiner* — Kito R Robinson
(74) *Attorney, Agent, or Firm* — Marshall, Gerstein & Borun LLP; Randall G. Rueth

(57) ABSTRACT

Methods and systems for modifying resources equipped to manage loss events and processing associated therewith based on an analysis of real-time data. An insurance provider can maintain historical data that indicates resources usage data for managing previously-occurring loss events. The insurance provider can receive real-time first-party and third-party loss event data from a variety of sources, the loss event data being associated with a recent or forecasted loss event. The insurance provider can compare the received loss event data to the historical data to determine that resources configured to manage insurance claim processing resulting from the loss event may need to be modified. In embodiments, the resources may be hardware or software resources, a workforce, physical goods or supplies, or other resources. The insurance provider can facilitate the appropriate resource modification by interfacing with various components and entities.

12 Claims, 6 Drawing Sheets

(51) Int. Cl.
  *G06Q 30/06* (2012.01)
  *G06Q 10/06* (2012.01)
  *G06Q 30/02* (2012.01)
  *G06F 17/30* (2006.01)

(52) U.S. Cl.
  CPC ....... *G06F 17/30566* (2013.01); *G06Q 10/06* (2013.01); *G06Q 10/0633* (2013.01); *G06Q 30/0281* (2013.01); *G06Q 30/0283* (2013.01); *G06Q 30/0603* (2013.01)

(58) Field of Classification Search
  USPC .................................. 705/4, 7.12, 7.23, 7.31
  See application file for complete search history.

(56) References Cited

U.S. PATENT DOCUMENTS

| | | | | |
|---|---|---|---|---|
| 6,914,525 | B2* | 7/2005 | Rao | G08B 21/10 340/531 |
| 7,783,544 | B2* | 8/2010 | Horowitz | G06Q 40/00 705/35 |
| 8,027,849 | B2* | 9/2011 | Johnson | G06F 19/327 705/2 |
| 8,261,122 | B1* | 9/2012 | Kappel | G06F 11/1402 714/2 |
| 8,311,865 | B2* | 11/2012 | Vogel | G06Q 10/06 705/7.11 |
| 8,656,404 | B2* | 2/2014 | Greene | G06F 9/5011 718/102 |
| 9,477,691 | B1* | 10/2016 | Reiner | G06F 17/30289 |
| 2004/0012491 | A1* | 1/2004 | Kulesz | G08B 21/12 340/506 |
| 2004/0075552 | A1* | 4/2004 | Rao | G08B 21/10 340/539.1 |
| 2005/0001720 | A1* | 1/2005 | Mason | G01C 21/206 340/539.13 |
| 2005/0027571 | A1* | 2/2005 | Gamarnik | G06Q 40/08 705/4 |
| 2006/0161467 | A1* | 7/2006 | Kumar | G06Q 10/06 705/80 |
| 2007/0219813 | A1* | 9/2007 | Moore | G06Q 30/02 705/500 |
| 2008/0046285 | A1* | 2/2008 | Greischar | G06Q 10/00 705/2 |
| 2008/0162180 | A1* | 7/2008 | Johnson | G06Q 30/0241 52/27 |
| 2009/0089078 | A1* | 4/2009 | Bursey | G06Q 10/101 705/300 |
| 2010/0049485 | A1* | 2/2010 | Lee | G06Q 10/087 703/6 |
| 2011/0016123 | A1* | 1/2011 | Pandey | G06F 17/30348 707/737 |
| 2011/0080940 | A1* | 4/2011 | Bocharov | H04N 21/4331 375/240.01 |
| 2011/0153368 | A1* | 6/2011 | Pierre | G06Q 10/067 705/4 |
| 2011/0301965 | A1* | 12/2011 | Hitney | G06Q 50/22 705/2 |
| 2012/0089496 | A1* | 4/2012 | Taylor | G06Q 40/04 705/35 |
| 2012/0197596 | A1* | 8/2012 | Comi | G06F 9/5066 702/188 |
| 2013/0332209 | A1* | 12/2013 | Sawada | G06Q 10/10 705/7.12 |
| 2013/0332474 | A1* | 12/2013 | Glaubman | G06F 17/30312 707/755 |
| 2014/0156323 | A1* | 6/2014 | Prieto | G06Q 10/0633 705/7.12 |
| 2015/0154712 | A1* | 6/2015 | Cook | G06Q 40/08 705/4 |
| 2016/0080173 | A1* | 3/2016 | Quick | G06Q 30/0202 705/7.31 |

OTHER PUBLICATIONS

Rodier, M. (2009). Ramping up for new regulation. Wall Street & Technology, 27(5), 29. Retrieved from http://dialog.proquest.com/professional/docview/846180867?accountid=142257 on Oct. 27, 2016.*

Terracotta announces in-genius. (Mar. 4, 2013). PR Newswire Retrieved from http://dialog.proquest.com/professional/docview/1314719576?accountid=142257on Oct. 27, 2016.*

* cited by examiner

SYSTEMS AND METHODS FOR MODIFYING RESOURCES TO MANAGE LOSS EVENTS

FIELD OF THE DISCLOSURE

The present disclosure generally relates to systems and methods for automatically allocating resources associated with managing loss events, and, more particularly, to platforms and techniques for analyzing real-time data and historical data to determine how to automatically modify resources based on expected losses or damage to properties.

BACKGROUND

Customers purchase casualty insurance policies to insulate themselves from various risks posed to their property. For example, a homeowner may purchase a fire insurance policy or a driver may purchase an automobile insurance policy. Various "loss events" can result in damage to this property which can lead to customers filing insurance claims for the damage to collect any monies owed according to the casualty insurance policy. For example, loss events can result from hurricanes, earthquakes, severe storms, tornados, hail storms, wildfires, and other causes. Generally, insurance providers have access to historical data that can comprise information such as the costs of property damage, the number of claims filed and percentages associated therewith, the amount of resources (e.g., claim representatives, computing resources) needed to manage insurance processing resulting from the loss events, amounts of specific parts or supplies that were required to repair damage, and other data. This historical data can assist insurance providers to adequately plan for a certain amount of resources to respond to insurance claims resulting from loss events.

However, each loss event results in varying or different amounts of damages and associated costs. For example, a "category 3" hurricane that hits a densely populated area on the East coast may cause more damage than a similar-scale "category 3" hurricane that impacts a sparsely populated area on the Gulf of Mexico. In the case of an approaching, currently-occurring, or recently-occurred storm or other loss event trigger, the historical data may not accurately account for an actual amount of damage or expected amount of damage. Therefore, the amount or level of resources that insurance providers plan for can often be insufficient or, in some cases, more than necessary.

Accordingly, there is an opportunity for systems and methods to more effectively and efficiently allocate or schedule resources used in managing insurance processing associated with loss events.

SUMMARY

In an embodiment, a computer-implemented method of modifying resources to manage loss events is provided. The method includes receiving loss event data related to a loss event of a particular type and access historical data associated with the particular type of the loss event, the historical data indicating a level of resources needed to manage the at least one previous loss event of the particular type. The method further includes comparing the loss event data to the historical data to determine how to modify the resources to manage the loss event and, based on the comparing, modifying the resources to manage the loss event.

In another embodiment, a system for initiating insurance processing associated with a loss event is provided. The system includes a communication module adapted to receive loss event data related to a loss event of a particular type, and a memory adapted to store historical data associated with the particular type of the loss event, the historical data indicating a level of resources needed to manage at least one previous loss event of the particular type. The system further includes a processor adapted to interface with the communication module and the memory. The processor is configured to execute non-transitory computer executable instructions stored in the memory to cause the processor to compare the loss event data to the historical data to determine how to modify the resources to manage the loss event and, based on the comparing, modify the resources to manage the loss event.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
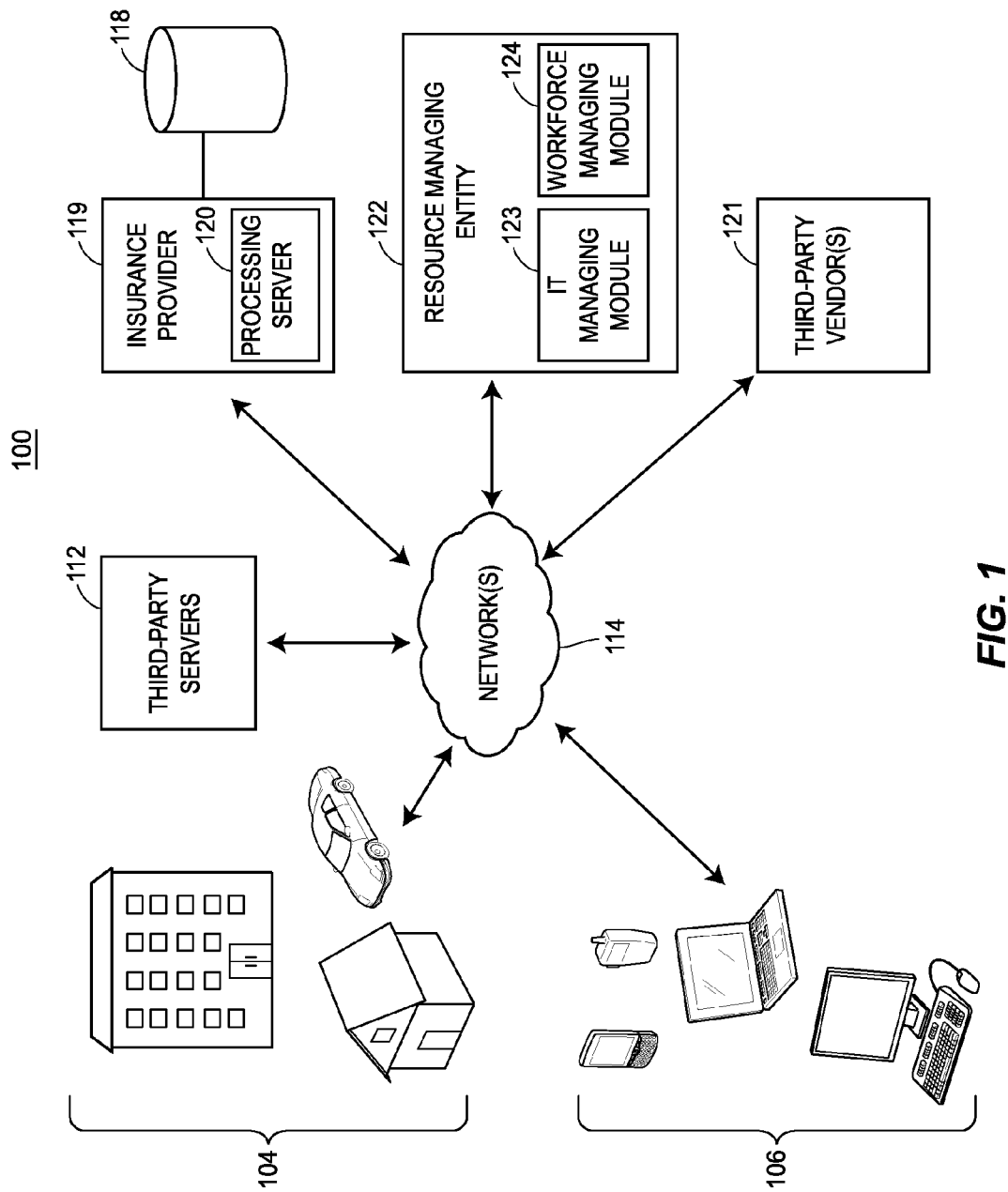
FIG. 1 depicts an example environment including components and entities associated with managing resources associated with loss events in accordance with some embodiments.

The novel methods and systems disclosed herein relate generally to analyzing real-time loss event data to modify resources associated with the management of loss events. According to embodiments, an insurance provider can maintain historical data associated with previously-occurred loss events, where the historical data can include data associated with the management of resources, including workforce data, computing resource data, parts or supplies data, and/or other data. The insurance provider can ingest real-time data related to a loss event from a variety of sources and can examine the ingested data to identify a loss event and a type of the loss event. Additionally, the insurance provider can compare the loss event and the type of the loss event to the historical data to determine whether any resources equipped to manage the loss event need to be altered, changed, adjusted, or modified in any way. Based on the comparison, the insurance provider or another entity may modify the resources accordingly.

The systems and methods as discussed herein enable more effective and efficient techniques for managing insurance claim processing resulting from loss events. In particular, the real-time analysis techniques as discussed herein result in improved resource allocation to manage loss events. The resources may be accurately scaled based on the anticipated (or actual) amount of damage or number of insurance claims resulting from the loss event. Accordingly, insurance providers may reduce costs resulting from a surplus of resources or the unanticipated need to increase resources. Further, customers or policy holders may experience more efficient insurance claim handling resulting from a balanced resource allocation or availability. Moreover, insurance providers may be able to measure time periods between loss event data ingestion and corresponding loss event identification (i.e., first notice of loss) to final claims settlement to serve as a baseline for improving customer service and response times for insurance claims processing.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

An insurance provider may offer or provide one or more different types of insurance policies. Types of insurance policies may include, for example, auto insurance; homeowners insurance; condominium owner insurance; renter's insurance; life insurance (e.g., whole-life, universal, variable, term, etc.); health insurance; disability insurance; long-term care insurance; annuities; business insurance (e.g., property, liability, commercial auto, workers compensation, professional and specialty liability, inland marine and mobile property, surety and fidelity bonds, etc.); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives, etc.); and other types of insurance products. In embodiments as described herein, the insurance providers process claims related to insurance policies that cover one or more properties (e.g., homes, automobiles, personal articles, and others), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business, etc.) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

FIG. 1 depicts an example environment 100 associated with resource modification using received loss event data. Although FIG. 1 depicts certain entities and components, it should be appreciated that additional or alternate entities and components are envisioned.

As shown in FIG. 1, the environment 100 includes example properties 104 capable of being insured or having insurance policies associated therewith. For example, the insurance policies can be associated with property insurance (e.g., car insurance, homeowner's insurance, renter's insurance, etc.), health insurance, life insurance, flood insurance, casualty insurance, and/or the like. The properties 104 can connect (e.g., using various communication modules) to an insurance provider 119 via one or more networks 114 such as, for example, a wide area network (WAN), a local area network (LAN), a personal area network (PAN), or other networks. The network 114 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). The insurance provider 119 can be any individual, group of individuals, company, corporation, or other type of entity that can issue insurance policies for customers, such as insurance policies associated with the properties 104. According to embodiments, the insurance provider 119 can include one or more processing server(s) 120 configured to facilitate the functionalities as discussed herein. Although FIG. 1 depicts the processing server 120 as a part of the insurance provider 119, it should be appreciated that the processing server 120 can be separate from (and connected to or accessible by) the insurance provider 119.

According to embodiments, various types of events that can occur and may give rise to various types of insurance claims for the example properties 104 according to the associated insurance policies. For example, the events (referenced herein as "loss events") that may give rise to a claim can be damage or loss to property (e.g., damage to a car, damage to a home, or other damages or losses), an injury, and/or the like. Once the damage of loss resulting from the loss event has occurred, the various components of the environment 100 can initiate insurance processing associated with that damage or loss. Alternatively or additionally, the various components of the environment 100 can initiate insurance processing before the loss event has occurred (e.g., if the loss event is forecasted), during the loss event, or after the loss event has occurred but before any damage is assessed or known.

Although not depicted in FIG. 1, the example properties 104 can be equipped with one or more sensors capable of recording data related to one or more loss events. For example, a sensor in an automobile may record damage to the hood and windshield during a hail storm and may transmit data about the damage to the processing server 120, for example using telematics techniques. Additionally or alternatively, a sensor in the roof of a house may record damage during a hail storm and may transmit data about the damage to the processing server 120 over a high-speed Internet connection. It should be appreciated that the sensors may be coupled to or part of any of a vehicle, a building, a house, or any other property (e.g., an RFID tag on a pallet of electronics in a warehouse), according to various techniques and conventions. It should further be appreciated that the sensors (and/or communication modules) associated with the properties 104 can transmit or provide the data to the processing server 120 according to other techniques or communication channels.

Of course, it will be understood that other data collecting and reporting devices may be used to gather data about a loss event. For example, as shown in FIG. 1, a set of devices 106 (e.g., cellular phone, smartphone, GPS navigation system, a tablet computer, a notebook or desktop computer, etc.) can be configured to detect and/or receive data related to a loss event or potential loss event, and transmit the data to the processing server 120 via the network 114. In some cases, a potential claimant (e.g., an individual having an insurance policy for one of the example properties 104 or another property) may use one of the set of devices 106 to transmit data about the loss event to the processing server 120 (e.g., by reporting data about the loss via a telephone call, by entering data about the loss into a webpage or application, by filling out a paper form and submitting via fax or physical mail, or by other techniques). In other cases, an insurance administrator or other individual associated with an insurance provider may access the device 106 to input loss event data and initiate a transfer of the loss event data to the processing server 120. For example, a potential claimant may visit an insurance provider office and a representative may input the loss event data relayed by the potential claimant. Herein, such sensor, claimant, and/or individual reported data about the loss event may be collectively referred to as "first-party data."

According to embodiments, the first-party data generally relates to information about loss events such as the occurrence and/or extent of damage, the location of the loss, the time of the loss, the customer(s) to which the loss is pertinent, the cause of the loss (e.g., an indication that a loss was caused by water, fire, physical impact, wind, and others), and/or the like. The first-party data can also include metadata such as the type of sensor reporting the data (e.g., make, model, version number, serial number, etc.), which software version the sensor is using to execute its functions, a timestamp for each data entry, the location of the sensor when it collected the data, information about the owner/renter of the sensor (e.g., name, address, customer ID number, and others), and/or the like. If the first-party data is submitted by a customer or company representative, the first-party data may also include metadata regarding when the loss data was reported, to whom the loss data was submitted, where the loss data was submitted, and/or the like.

As depicted in FIG. 1, the processing server 120 can also connect to one or more third-party servers 112. Although FIG. 1 depicts the third-party server(s) 112 being connected to the processing server 120 via the network 114, it should be appreciated that the third-party server(s) can be a part of the processing server 120. According to embodiments, the third-party server 112 can include data from news sources (e.g., national news networks, regional news networks, newspapers, magazines, news websites, and others), data from weather sources (e.g., the National Oceanic and Atmospheric Administration; other federal, state, or local governmental weather bureaus; commercial weather services; weather websites; and others), data from governmental sources (e.g., the Department of the Interior, the Department of Homeland Security, other federal, state, and local governmental sources, and others), data from social networks (e.g., Facebook®, Twitter®, Google+®, Instagram®, and others), data from public databases, data from private databases (e.g., consultants, data miners, surveyors, and others), or other sources. Herein, such data from the third-party server(s) may be collectively referred to as "third-party data," and can include loss event data relating to one or more loss events that have happened (e.g., a lightning strike), are happening (e.g., a flood), or may happen in the future (e.g., a forecasted hurricane). According to embodiments, the first-party data and/or third-party data may be received by the processing server 120 as an Advanced Message Queuing Protocol (AMQP) message. It should be appreciated by those skilled in the art that receiving the first- and third-party data as AMQP messages can enable the processing server 120 to receive the data asynchronously and in a standardized format. Accordingly, the sources providing the first- and third-party data may provide the data in the AMQP message format.

According to embodiments, the processing server 120 can be configured to store or otherwise interface with a historical datastore 118 that stores data related to various loss events and data associated therewith such as insurance claims, resource usage employed or instantiated to manage or respond to the loss events, resource usage suggestions, and/or other data. For example, the historical datastore can store data associated with a hail storm, such as the number of claim representatives deployed to manage resulting insurance claims, the effect on an associated financial reserve, information technology resource usage (e.g., server usage, laptop usage, etc.), and/or other data. It should be appreciated that the various loss events can correspond to actual events (e.g., a specific hurricane) or to general loss events (e.g., a "category 3" tornado). As illustrated in FIG. 1, the processing server 120 can interface with a resource managing entity 122 and one or more third party vendors 121 to manage one or more resource allocations based on an analysis of the received first-party and third-party data as well as the historical data. It should be appreciated that the resource managing entity 122 and the third party vendors 121 can be a combination of software and hardware components. Further, although FIG. 1 depicts the resource managing entity 122 separate from the insurance provider 119, it should be appreciated that the insurance provider 119 (or the processing server 120 thereof) can incorporate the resource managing entity 122.

According to embodiments, the resource managing entity 122 can be configured to manage various resources associated with a loss event. As illustrated in FIG. 1, the resource managing entity 122 can include an information technology (IT) managing module 123 and a workforce managing module 124. The IT managing module 123 can be configured to modify an allocated or instantiated amount of various IT resources (e.g., servers, computing devices, software applications, etc.) based on the analysis of the first-party data, the third-party data, and the historical data. Similarly, the workforce managing module 124 can be configured to modify an allocated or scheduled workforce level associated with managing loss events. The third party vendors 121 can be entities associated with performing repairs or replacements resulting from damage associated with the loss events. For example, the third party vendors 121 can be auto body shops, lumber yards, home goods stores, and/or other vendors who perform services or sell supplies associated with repairing or replacing property damage. It should be appreciated that various types of IT resources, workforces, and third party vendors are appreciated.

According to embodiments, the processing server 120 can be configured to compare any received first-party and third-party data associated with a loss event to any historical data associated with the loss event (or a similar loss event). Based on the comparison, the processing server 120 can interface with the resource managing entity 122 and/or the third party vendors 121 to facilitate resource modification. For example, the historical data associated with a "category 3" tornado in a semi-populated area can suggest that a total of ten (10) claim representatives be deployed to the affected area to adequately manage claims processing resulting from an expected amount of damage. However, the third-party and/or first-party data can indicate that the damage resulting from a currently-occurring or recently-occurred "category 3" tornado is greater than the expected amount of damage, which may necessitate the deployment of more than 10 claim representatives. Therefore, the processing server 120 can communicate with the resource management entity 122 to, for example, schedule additional claim representatives for deployment to the affected area.

For further example, the historical data associated with a typical or average hailstorm may indicate that an average of 2% of potential claimants will file a claim for a replacement car windshield. However, the third-party and/or first-party data can indicate that a currently-occurring or recently-occurred hailstorm includes hail that is larger than normal, and therefore that there may be more claims for replacement windshields than expected. Accordingly, the processing server 120 (or a user or administrator associated therewith) may communicate with a third-party auto body shop (which, in some cases, may be a preferred vendor) to suggest that it increase its inventory of replacement windshields and any associated replacement parts or supplies. Accordingly, the third-party auto body shop may have an adequate supply of parts to satisfy any resulting repairs.

Figure 2:
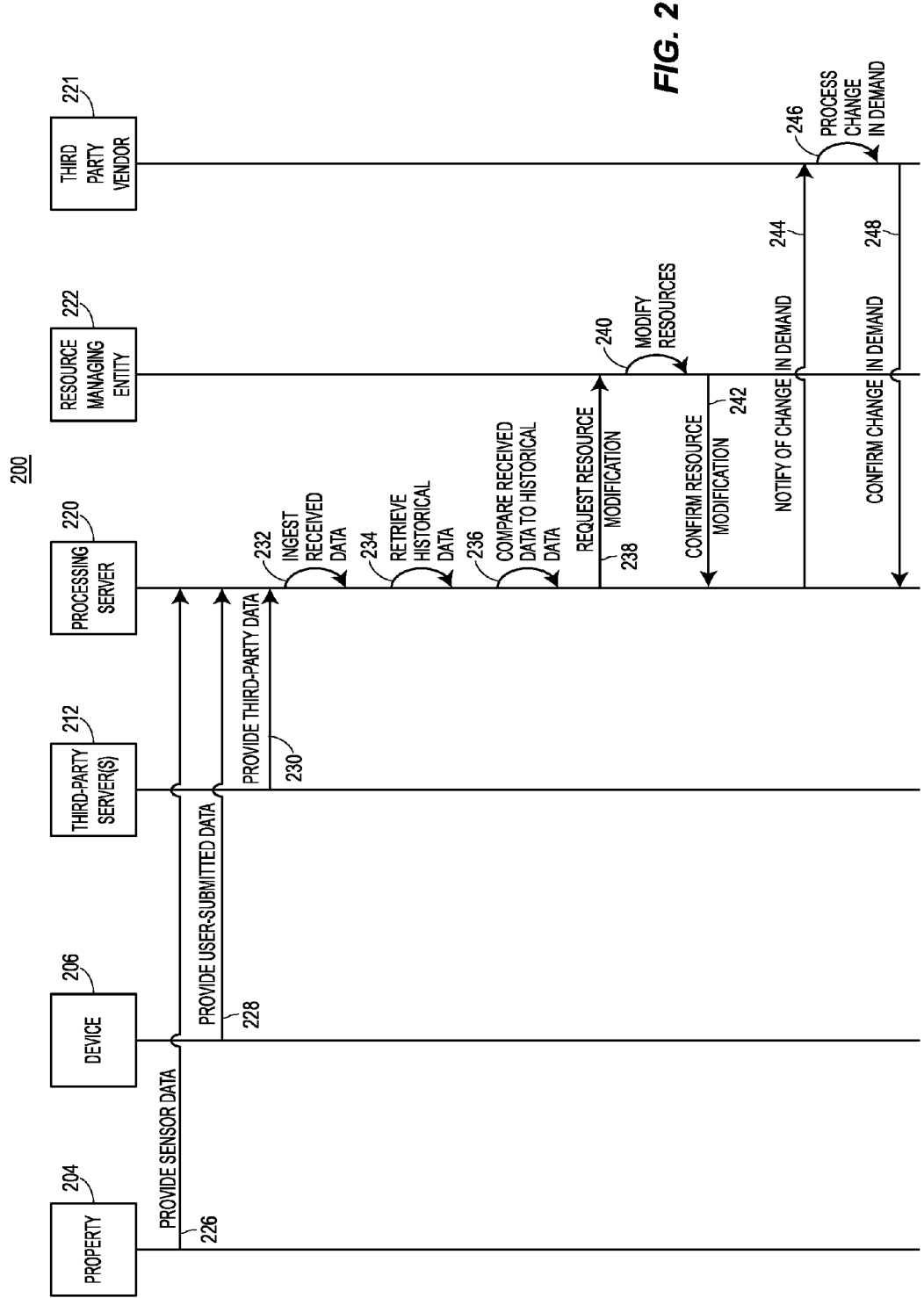
FIG. 2 depicts an example diagram associated with managing resources associated with loss events in accordance with some embodiments.

Referring to FIG. 2, depicted is a diagram 200 illustrating techniques for modifying resources associated with loss event responses. In particular, FIG. 2 includes a property 204 (such as one of the properties 104 as described with respect to FIG. 1), a device 206 (such as one of the devices 106 as discussed with respect to FIG. 1), a third-party server 212 (such as one of the third party server(s) 112 as discussed with respect to FIG. 1), a processing server(s) 220 (such as the processing server 120 as discussed with respect to FIG. 1), a resource managing entity 222 (such as the resource managing entity 122 as discussed with respect to FIG. 1), and a third party vendor 221 (such as the third party vendor 121 as discussed with respect to FIG. 1).

Although not shown in FIG. 2, it should be appreciated that the processing of the diagram 200 may be triggered by or initiated before, during, or after the occurrence of a loss event. For example, there may be a tornado in a specific area that can constitute a loss event. The property 204 can provide (226) sensor data (or another type of loss event data) to the processing server(s) 220. For example, a wind gauge on a house can sense high winds and provide data associated with the high winds to the processing server(s) 220. In some cases, the device 206 can provide (228) user-submitted data to the processing server(s) 220, such as if a user (e.g., the customer, an insurance representative, or others) of the device manually enters data about a specific loss event. In further cases, the third-party server 212 can provide (230) third-party data to the processing server(s) 220. For example, the third-party data can include social media data related to a blizzard.

Figure 4:
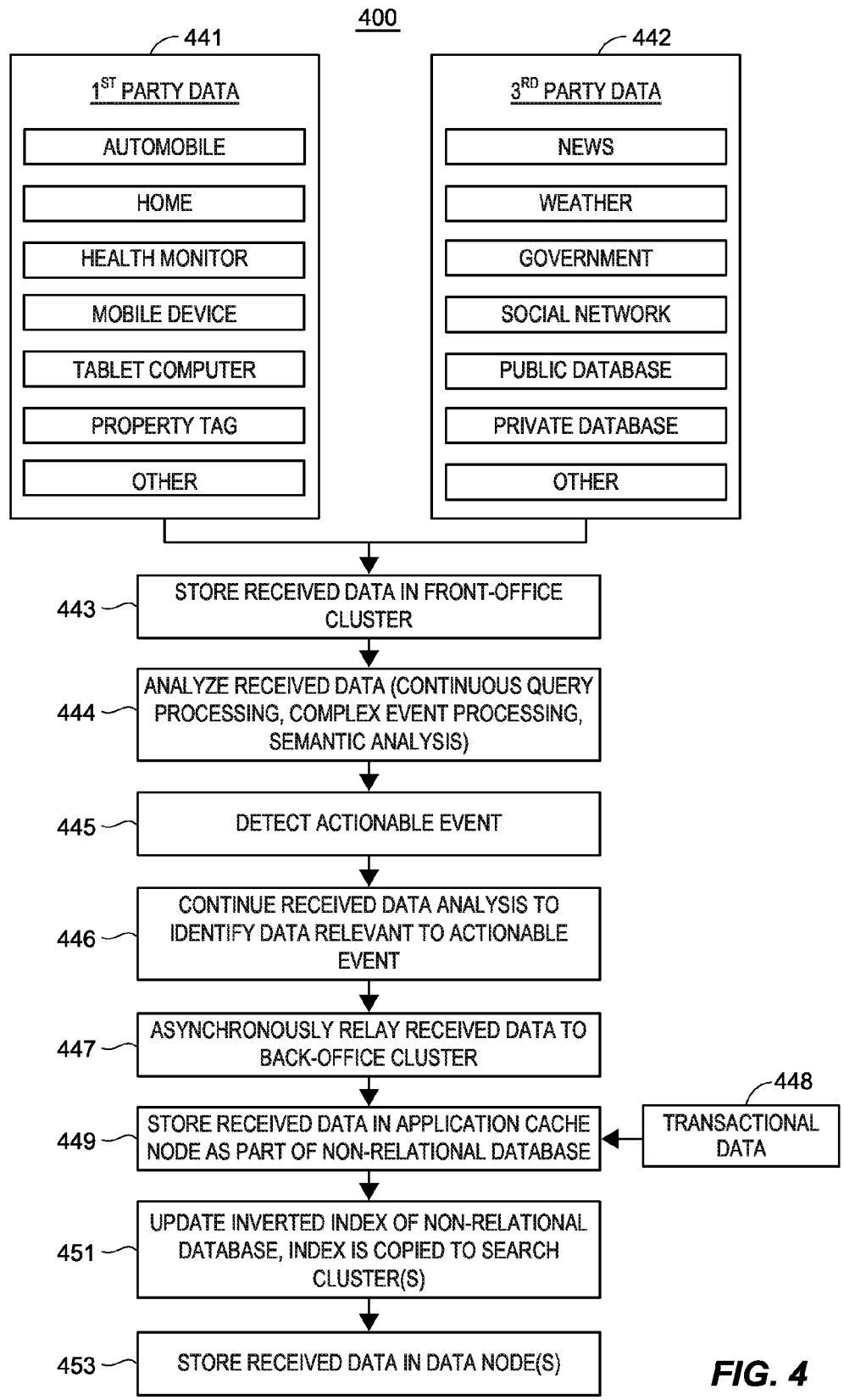
FIG. 4 depicts a flow diagram of processing information related to an actionable loss event in accordance with some embodiments.

After receiving the sensor data and/or the user-submitted data (collectively the first-party data), and/or the third-party data, the processing server(s) 220 can ingest (232) the received data. In some embodiments, it may be advantageous for the processing server(s) 220 to store the ingested data in high-speed memory (e.g., RAM) and/or bulk storage (e.g., magnetic hard disk drive). FIG. 4 depicts more detailed processing associated with the processing server(s) 220 ingesting the received data. According to embodiments, the processing server(s) 220 can examine the received data to identify the occurrence of a loss event as well as a type of the loss event. For example, the processing server can ingest and examine the received data to determine that a severe thunderstorm is occurring or is forecasted to occur.

The processing server(s) 220 may then perform functions to process and manage resource usage. In particular, the processing server(s) 220 can retrieve (234) historical data related to the loss event specified in the received data. In some embodiments, the historical data can include data of one or more loss events that are similar to the loss event indentified in the received data (e.g., the received data can indicate a specific hurricane and the historical data can include data about one or more hurricanes that occurred in the past). In other cases, the historical data can relate to a type of loss event that matches or is similar to a type of the loss event identified in the received data (e.g., the received data can indicate a specific category of tornado and the historical data can include data associated with that category of tornado). The historical data can further include resource usage data associated with the loss event. In particular, the resource usage data can indicate an amount or level of workforce previously used or deployed to manage the loss event indicated in the historical data. Further, the resource usage data can indicate an amount or level of computing resources that were used or instantiated to manage the loss even indicated in the historical data. Additionally, the resource usage data can include data about an inventory of parts or supplies that were replaced or generally used to manage or handle the damage resulting from previous loss events.

The processing server(s) 220 can compare (236) the received data to the historical data. In particular, the processing server(s) 220 can compare the loss event data included in the received data to the loss event data included in the historical data. In some cases, the processing server(s) 220 can determine that the received data indicates a greater amount of damage (or a greater expected amount of damage) from the particular loss event than what is expected as indicated in the historical data. In other cases, the processing server(s) 220 can determine that the received data indicates a lesser amount of damage (or a lesser expected amount of damage) from the particular loss event than what is expected as indicated in the historical data. Accordingly, the processing server(s) 220 can determine how to modify (i.e., determine the degree of modification) one or more resources that can be initialized or deployed to manage or handle the loss event.

Based on the comparison, the processing server(s) 220 can send a request (238) to the resource managing entity 222 to modify one or more specific resources. For example, the processing server(s) 220 can request to schedule more claims processing agents to manage potential insurance claim filings as a result of an increased property damage expectation. For further example, the processing server(s) 220 can request to decrease the amount or level of instantiated hardware resources as a result of an expected decrease in claim filings. It should be appreciated that other resource modification scenarios are envisioned. The resource managing entity 222 can modify (240) resources according to the request. For example, the resource managing entity 222 can schedule or remove individuals from a workforce schedule, instantiate or reduce any hardware or software computing resources, and/or perform other resource modifications. The resource managing entity 222 can send (242) a confirmation of the resource modification to the processing server(s) 220.

In some embodiments, the processing server can notify (244) one or more third party vendors 221 of a change in demand of a certain part or supply, based on the comparison of the historical data and the received data. For example, the received data can indicate more damage from a particular earthquake having a certain magnitude (e.g., a 6.0 on the Richter scale) than the damage expected from a "typical" earthquake having the same magnitude (as indicated in the historical data). Accordingly, in this example, the processing server(s) 220 can notify a third party vendor such as a building supply company that there may be an increased demand for building supplies as a result of the increased amount of damage. The third party vendor 221 can process (246) the change in demand accordingly and send (248) a confirmation of the change in demand to the processing server(s) 220. Referring to the previous example, the building supply company can order, stock, and/or manufacture more building supplies. According to some additional embodiments, the processing server can examine the received data and optionally the historical data to identify customers who may be potentially affected by the loss event.

Figure 3:
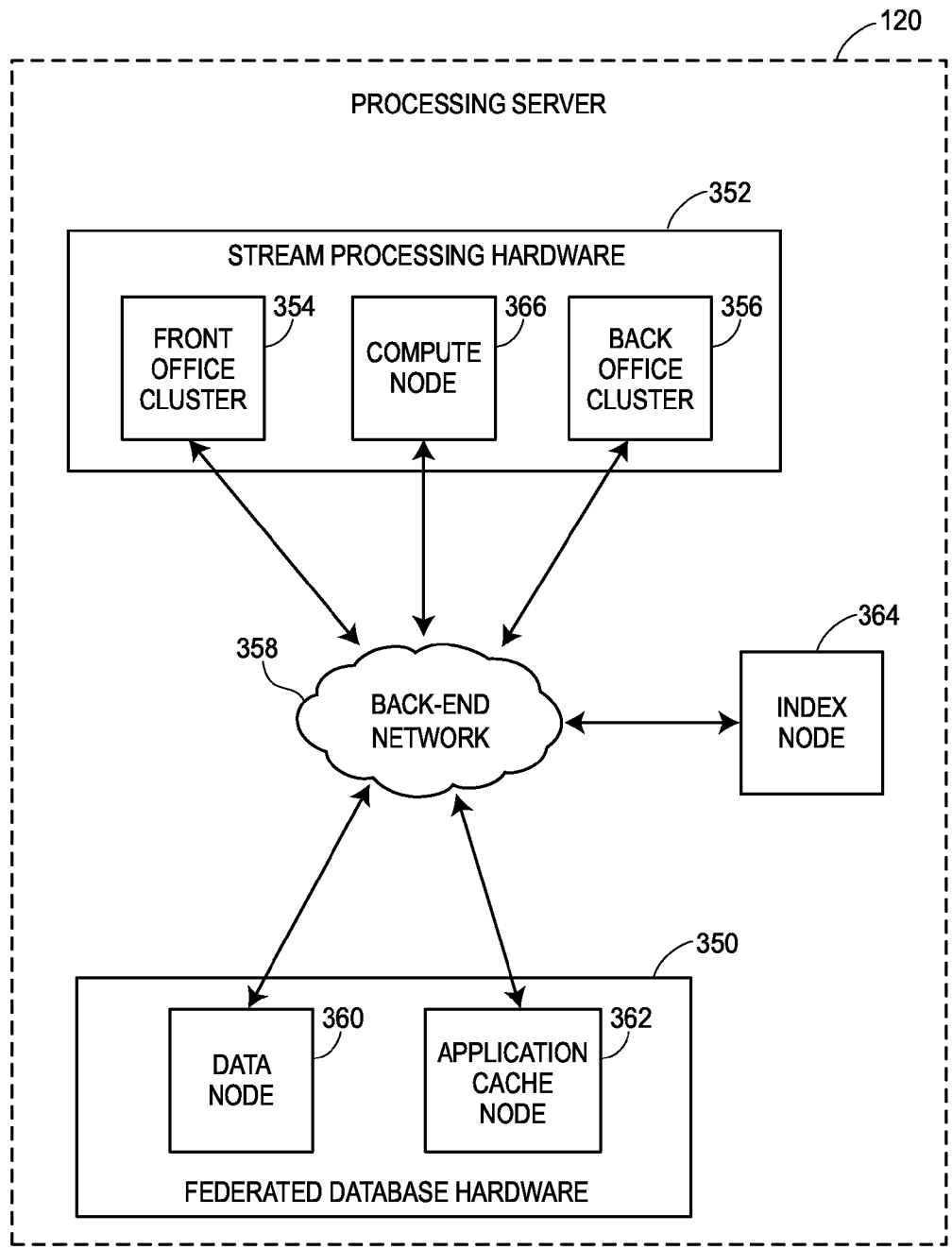
FIG. 3 is a block diagram of a processing server in accordance with some embodiments.

Referring to FIG. 3, depicted is a more detailed view of the processing server 120 and components thereof configured to ingest and store loss event data and any resulting data or information. Before processing or using any received data as discussed herein, the processing server 120 can process and store the received data in a non-relational database (e.g., one or more Log-Structure Merge Tree (LSM-Tree) Databases such as HBase stored using a Hadoop framework), a process referred to herein as "ingestion." The one or more non-relational databases may be stored in a federated database hardware 350. Generally speaking, the processing server 120 can receive two different kinds of data: transactional data and non-transactional data. Transactional data includes data and documents with direct monetary impact (e.g., insurance claims, insurance policies, financial transactions between the customer and insurance company, financial transactions between insurance companies, banking records, and others). Non-transactional data refers to data that does not have a direct monetary impact (e.g., data gathered by sensors in the field, posts to social networks, news reports, weather reports, and others). According to some embodiments, it may be advantageous for the processing server 120 to ingest transactional data and non-transactional data differently. In particular, it may be advantageous for the processing server 120 to ingest transactional data into the federated database hardware 350 and ingest non-transactional data using dedicated stream processing hardware 352 in order to process incoming heterogeneous data with varying latency requirements. As shown in FIG. 3, the stream processing hardware 352 can be connected to the federated database hardware 350 via a dedicated back-end network 358, which may be understood to be any type of data connection. According to embodiments, a compute node 366 can facilitate any processing (e.g., memory reads, memory writes, and others) associated with the stream processing hardware 352.

Referring to FIG. 4, depicted is a block diagram of an example data reception and ingestion technique 400 implemented by the processing server 120 as depicted in FIG. 3. The processing sever 120 can receive first-party data (represented as block 441) and/or third-party data (represented as block 442). As discussed herein, the first-party data 441 can include data collected by sensors associated with properties (e.g., sensors in an automobile, house, property tag, mobile device, etc.) or data relayed to the processing server 120 by a customer or company representative via a device (e.g., via email, telephone call, fax, input via website, input via application, etc.). Further, as discussed herein, the third-party data 442 can include data or information from various sources such as those relating to news, weather, government, social networks, public databases, private databases, and others.

Referring to FIG. 4 in conjunction with FIG. 3, when a new portion of non-transactional data is received by the processing server 120 (e.g., as an AMQP message), the data is routed (block 443) to a front office cluster 354 of the stream processing hardware 352 for storage. Depending on the type of data, received data may be prioritized for immediate ingestion processing off the front office cluster 354 or sent to a back office cluster 356 for later ingestion. For example, transactional data such as with a first notice of loss may be ingested directly off the front office cluster 354 via a search-based application (SBA). In embodiments, non-transactional data and/or transactions from machine sources (e.g., telematics data) can be ingested through the stream processing hardware 352 and then to the federated database hardware 350, and specifically from the front office cluster 354 to the back office cluster 356 then to the federated database hardware 350.

According to embodiments, the front office cluster 354 may be used to address low latency ingesting and processing, primarily with RAM, and the back office cluster 356 may be used to address processing with less demanding latency, primarily with direct-attached storage (DAS) such as an array of hard disk drives. In some embodiments, it may be advantageous to initially receive all data at the front office cluster 354 and asynchronously copy data with less demanding latency to the back office cluster 356 continuously as new data is received (block 447). Of course, it will be appreciated that it may also be advantageous for data with particularly low latency to be processed off the front office cluster 354 without or prior to it being sent to the back office cluster 356. A given SBA can specify data ingestion routes (e.g., front office cluster 354 to back office cluster 356 to federated database hardware 350, and other routes).

Because data is received continuously and it is advantageous to ensure that received data is made available for access as soon as possible, the ingestion of any received data from the front office cluster 354 may include routing the received data to a high-speed memory store. Because the processing and/or modification of the data discussed below may occur in real-time as the data is received or used, it is advantageous for the data processor(s) to be able to access data via high-speed memory. It may further be advantageous to load data into high-speed memory as it is needed (or anticipated to be needed) to minimize the amount of high-speed memory that is allocated at a certain period of time. Additionally, as the data is being processed, the underlying data may need to be changed or updated (e.g., correcting a typo in a name, updating an old mailing address, etc.). Thus, as the change is made to the data entry loaded into high-speed memory, the updated data entry is used for whatever processing is pending, and cached to allow the entry in bulk storage to be updated asynchronously when computing resources are available (i.e., write-behind).

It may be advantageous to perform complex event processing (CEP), continuous query processing, and/or semantic processing on the received data using either or both of the front office cluster 354 and the back office cluster 356 (block 444). In an example, the CEP, continuous query processing, and/or semantic processing may be performed by one or more front office clusters 354 on received data stored in the in-memory cache of the one or more front office clusters 354. In another example, the CEP, continuous query processing, and/or semantic processing may be performed by one or more back office clusters 356 on received data stored on a hard disk drive of the one or more back office clusters 356.

According to embodiments, the CEP results in the identification of an occurrence of an event based on business needs for a given search-based application (SBA) along with a corresponding action. The event and action mapping can be a many-to-many relationship, whereby one event may spawn multiple actions and many events may spawn an action. The front office cluster 354 and the back office cluster 356 may be used to relay events to actors using a "publish-subscribe" pattern to perform the CEP for a given SBA. In some embodiments, the CEP may be self-contained within a single process. It should be appreciated that actions may generate transaction or non-transaction data which can be routed for storage in the federated database hardware 350. Identified events that are specific to a given SBA that acted upon those events in producing transaction or non-transaction data are likely to be recorded alongside and in the form of data enrichment and audit. In some embodiments, all data recorded on the federated database hardware 350 may be indexed with an inverted index which permits information retrieval and/or search. Further, transactional and non-transactional data enriched with acted-upon event identifiers may be visible to search along with data stored in the federated database hardware 350.

Referring back to FIG. 4, and as discussed herein, the CEP may be used to identify an actionable event (block 445). After identifying an actionable event, the CEP may further be used to identify other pieces of data related or relevant to the actionable event (block 446). For example, the back-end network 358 may receive an official hail storm alert from a governmental weather agency (e.g., the NOAA), which may be identified as an actionable event and may trigger the use of CEP techniques to identify data that may be associated with the storm alert (e.g., damage reports from sensors in automobiles/houses, social media posts about a hail storm, local news coverage of a hail storm, or other data). The CEP may include identifying characteristics about the triggering event such as location, affected population, and/or the like, and search for data and/or words and phrases relating to the triggering event that are substantially related to the identifying characteristics. In the hail storm example discussed above, CEP may include identifying the county or counties included for which the hail storm alert was issued and performing continuous query processing for data and/or words and phrases that correlate to hail damage. The CEP may further include the use of semantic processing tools and techniques to improve the identification of relevant data. For example, the back-end network 358 may use semantic classification software such as Apache® Stanbol. Such semantic processing may be useful to evaluate data by contextualizing search query hits. For example, semantic processing may be used to identify references in news coverage and social media posts to "hail" that are associated with the storm alert (e.g., a social media post consisting of a photograph of a large hailstone with a caption about the size of hailstones falling in the posting user's backyard) and exclude references that are not relevant (e.g., a social media posting by a user complaining about the difficulty of finding a taxi cab to hail).

Actionable events may be any of a number of events that have the potential to affect claims by a plurality of customers. In addition to weather alerts, actionable event triggers may include recall notices from an automobile manufacturer or automobile manufacturer supplier, an earthquake notification from the United States Geological Survey or other agency, a news report of a man-made disaster (e.g., a multiple-vehicle collision, a train derailment, a chemical spill, etc.), a report of a sudden swarm of insects, etc. Actionable events may be single occurrences (e.g., a hail storm) or on-going events (e.g., a swarm of insects). When data that may be associated with an actionable event is identified, a record may be made (e.g., an entry in an index) that can store at least a portion of the data. Additionally, non-relevant data may be archived in bulk storage for recall at a later time. This record may be used in facilitating the resource modification functionalities as discussed below in connection to FIG. 5.

After a datum has been subject to continuous query processing at least once (e.g., to determine whether the datum has information that should trigger an actionable event and/or analyze the datum to determine whether it is relevant to one or more actionable events), the datum may be asynchronously received at the back-office cluster 356 (block 447). After being received, the datum may be queued for indexing and inclusion in one or more non-relational databases stored in the back-end network 358 (e.g., a non-relational database stored in one or more application cache nodes 362 and/or one or more data nodes 360 of the federated database hardware 350). Additionally, the back-end network 358 may receive transactional data as discussed above, which may also be queued for indexing and inclusion in one or more non-relational databases stored in the back-end network 358 (block 448). When computing resources are available, then any queued data (transactional or non-transactional) may be stored as a data transfer object (DTO) in an In Memory Work In Progress (WIP) Data Store stored on one or more application cache nodes 362 as part of one or more non-relational databases (block 449).

It may be advantageous to index the received data as each datum is added to the one or more non-relational databases to make information retrieval more efficient (block 451). The received data may be indexed using one or more inverted indexes. In one embodiment, an inverted index may be an index data structure with mapping information indicating where content (e.g., words, numbers, etc.) is located in each datum. The inverted indexes may enable the one or more non-relational databases to be full text searchable. In an example, the back-end network 358 may use Apache® Lucene, an information retrieval software library, to generate the one or more inverted indexes. Additionally, it may be advantageous to have one or more components of the back-end network 358 dedicated to generating and storing the one or more indexes, such as in one or more index nodes 364. If one or more dedicated index nodes 364 are used, the index nodes 364 may communicate with the application cache nodes 362 in which the received data is stored to generate the one of more indexes and to store the indexes at the index nodes 364.

Once a datum is stored in the In-Memory WIP Data Store, it may be replicated in a non-relational database spanning the one or more data nodes 360 (block 453). As discussed below, there may be a plurality of the data nodes 360, and the datum may be replicated with a copy stored on multiple data nodes 360 for redundancy. Once a datum has been replicated onto the one or more data nodes 360, it may be advantageous to remove the datum from the In-Memory WIP Data Store. In particular, if the copy of the datum stored in the In-Memory WIP Data Store is not currently in use or predicted to be in use in the near future, the copy of the datum stored in the In-Memory WIP Data Store may be deleted and the space in memory de-allocated. It may be advantageous to structure the In-Memory WIP Data Store such that when memory is de-allocated, some of the hardware providing the In-Memory WIP Data Store may be turned off to conserve power and reduce heat in one or more data centers in which the back end components are situated.

Figure 5:
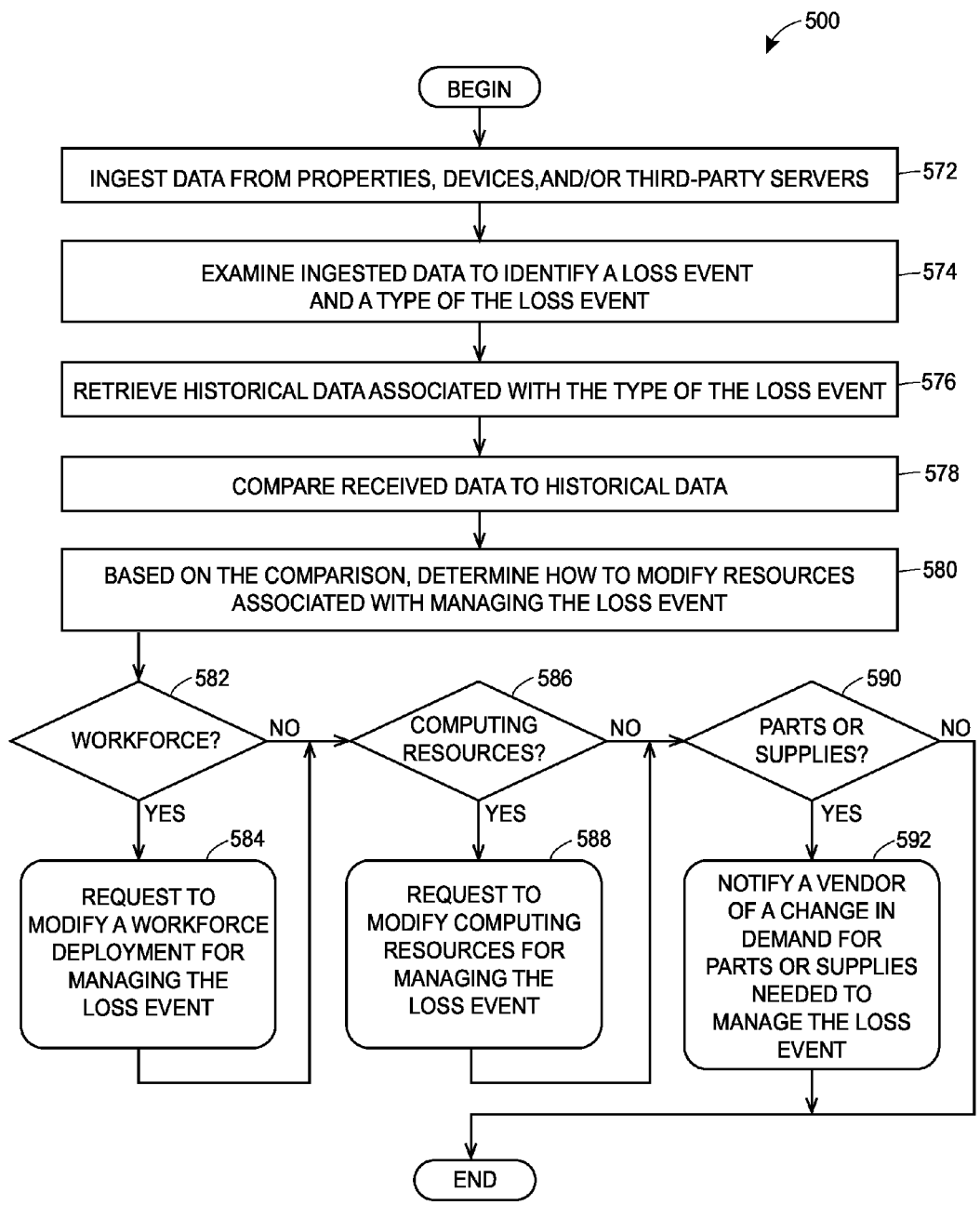
FIG. 5 depicts a flow diagram modifying resources to manage loss events in accordance with some embodiments.

Referring to FIG. 5, depicted is a block diagram of an example resource modification technique 500 implemented by the processing server 120 as depicted in FIG. 1. The processing server can ingest (block 572) first-party and third-party data associated with properties, devices, and/or third-party servers according to the techniques as discussed herein. The processing server can examine (block 574) the ingested data to identify a loss event and a type of the loss event. In embodiments, the ingested data can indicate that the loss event is forecasted to occur, is currently occurring, or has already occurred. According to embodiments, the type of the loss event can be a category, class, classification, grouping, set, or any other type of information that indicates a characteristic of the loss event. For example, the type of the loss event can be a hurricane, a tornado, a hail storm, a wildfire, a severe storm, as optionally a degree or category associated therewith, or any occurrence capable of causing property damage.

The processing server can retrieve (block 576) historical data associated with the type of the loss event. In embodiments, the historical data can be data related to a previous occurrence that is similar to the loss event and/or the type of the loss event. For example, if the type of the loss event is a category 3 hurricane, the historical data can include data associated with previous category 3 hurricanes. The historical data can also include a level or amount of resources (e.g., workforce, hardware and/or software resources, etc.) that were used, employed, initialized, scheduled, and/or the like to manage the damage and claims resulting from the previous loss event occurrences.

The processing server can compare (block 578) the received data to the historical data. In embodiments, the comparison can be an analysis of the received data and the historical data to determine differences between the historical data and the received data. For example, the received data may indicate that more damage is expected from the current loss event than was experienced in a similar loss event indicated in the historical data. The processing server can, based on the comparison, determine (block 580) how to modify resources associated with managing the loss event. In embodiments, the comparison can reveal an increased (or decreased) amount of anticipated damage resulting from the loss event, and the resource modification can be commensurate with this increased (or decreased) amount.

Referring to FIG. 5, the processing server can determine (block 582) if the resource modification indicates a workforce modification. If the resource modification indicates a workforce modification ("YES"), processing can proceed to block 584 in which the processing server can request to modify a workforce deployment for managing the loss event, after which processing can proceed to block 586. For example, if the comparison indicates an increased amount of damage, the processing server can request to schedule additional workforce individuals. If the resource modification does not indicate a workforce modification ("NO"), processing can proceed to block 586 in which the processing server can determine if the resource modification indicates a computing resource modification.

If the resource modification indicates a computing resource modification ("YES"), processing can proceed to block 588 in which the processing server can request to modify computing resources for managing the loss event, after which processing can proceed to block 590. If the resource modification does not indicate a computing resource modification ("NO"), processing can proceed to block 590 in which the processing server can determine if the resource modification indicates a parts or supplies modification. If the resource modification indicates a parts or supplies modification ("YES"), processing can proceed to block 592 in which the processing server can notify a vendor of a change in demand for parts or supplies needed to manage the loss event, after which processing can end or proceed to any other functionality. If the resource modification does not indicate a parts or supplies modification ("NO"), processing can end or proceed to any other functionality.

Figure 6:
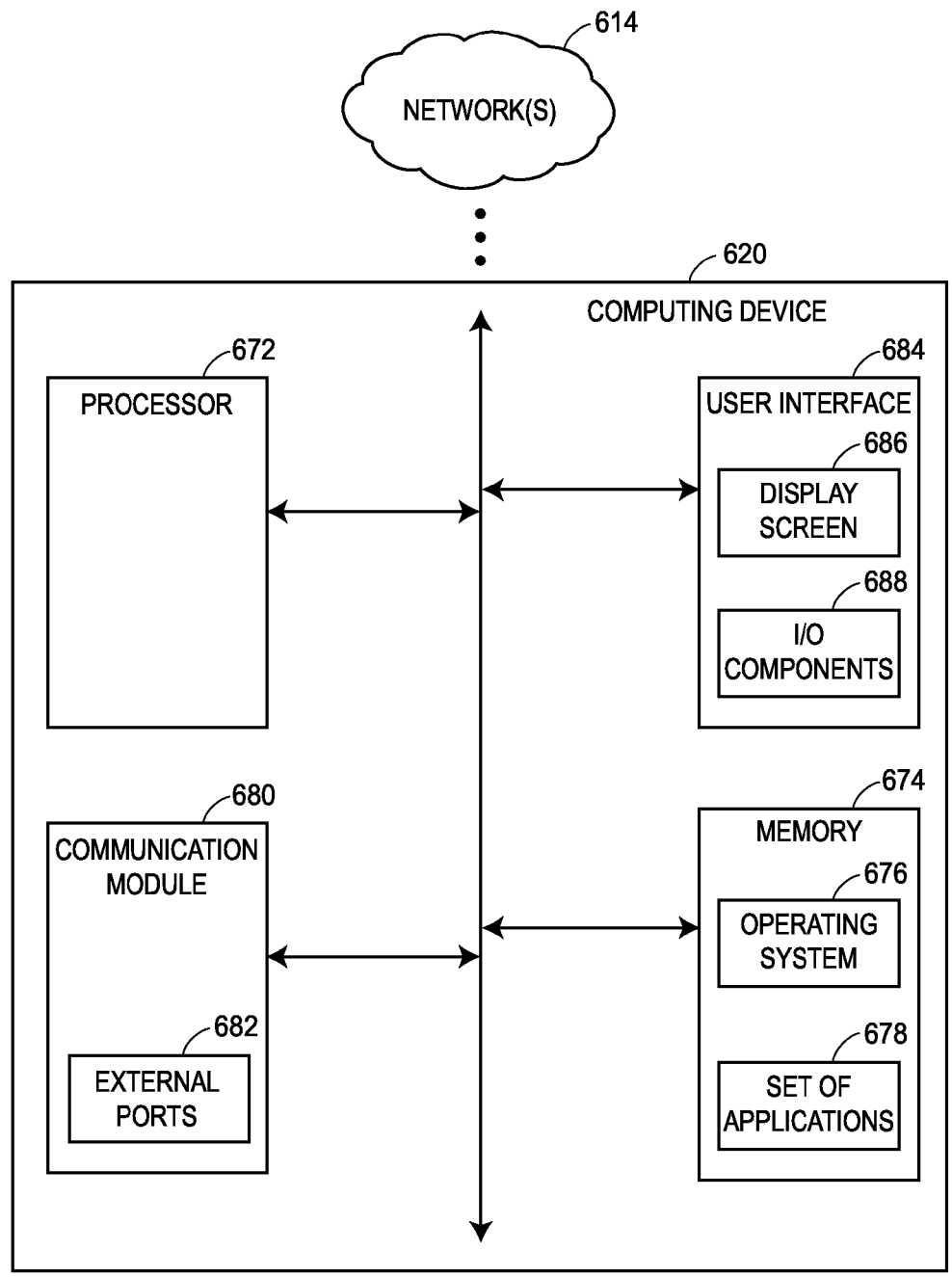
FIG. 6 is a block diagram of a computing device in accordance with some embodiments.

FIG. 6 illustrates an example computing device 620 (such as at least a portion of the processing server 120 as discussed with respect to FIG. 1) in which the functionalities as discussed herein may be implemented. It should be appreciated that the computing device 620 can be a part of the processing server 120 or as part of any of the components (e.g., 350, 352, 354, 356, 360, 362, 364, 366) of the processing server 120, as discussed herein. The computing device 620 can include a processor 672 as well as a memory 674. The memory 674 can store an operating system 676 capable of facilitating the functionalities as discussed herein as well as a set of applications 678 (i.e., machine readable instructions). For example, one of the set of applications 678 can facilitate the resource modification, as well as perform other functionalities as discussed herein. The processor 672 can interface with the memory 674 to execute the operating system 676 and the set of applications 678. According to embodiments, the memory 674 can also store data associated with insurance policies, such as any specified coverages or other parameters, customer data, loss event data, and/or any other data as discussed herein. The memory 674 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing device 620 can further include a communication module 680 configured to communicate data via one or more networks 614. According to some embodiments, the communication module 680 can include one or more transceivers (e.g., WWAN, WLAN, and/or WPAN transceivers) functioning in accordance with IEEE standards, 3GPP standards, or other standards, and configured to receive and transmit data via one or more external ports 682. For example, the communication module 680 can receive loss event data from various sources via the network 614. For further example, the computing device 620 can transmit resource modification instructions to various entities or components via the communication module 680 and the network(s) 614. The computing device 620 may further include a user interface 684 configured to present information to a user and/or receive inputs from the user. As shown in FIG. 6, the user interface 684 includes a display screen 686 and I/O components 688 (e.g., ports, capacitive or resistive touch sensitive input panels, keys, buttons, lights, LEDs, speakers, microphones, and others). According to embodiments, the user may access the computing device 620 via the user interface 684 to process insurance policies and/or perform other functions. In some embodiments, the computing device 620 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 672 (e.g., working in connection with the operating system 676) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of modifying resources to manage loss events, the method comprising:

receiving loss event data related to a loss event, the loss event data (i) recorded by at least one sensor associated with at least one property and (ii) received in real time during occurrence of the loss event;

ingesting the loss event data using dedicated stream processing hardware connected to federated database hardware, the loss event data ingested from a front office cluster to a back office cluster of the dedicated stream processing hardware;

routing the loss event data to a high-speed memory store;

performing, by one or more processors, complex event processing on the loss event data in the high-speed memory store to identify (i) a particular type of the loss event, and (ii) a degree associated with the particular type and indicating an expected amount of damage from the loss event;

accessing historical data associated with the particular type of the loss event and the degree associated with the particular type, the historical data indicating a level of resources needed to manage at least one previous loss event of the particular type and of the degree, the resources comprising physical parts or supplies and computing resources;

comparing, with the one or more processors, the loss event data to the historical data;

based on the comparison of the loss event data to the historical data, determining, (i) in real time as the loss event data is received and (ii) during occurrence of the loss event:

that the loss event data indicates a different amount of damage than that expected by the historical data, and an anticipated amount of the physical parts or supplies, according to the different amount of damage, needed to manage the loss event;

contacting a vendor or supplier of the physical parts or supplies to notify the vendor or supplier of the anticipated amount of the physical parts or supplies; and modifying a level of the computing resources to employ in managing the loss event.

2. The method of claim 1, wherein the resources further comprise a workforce, and wherein the method further comprises:

modifying a level of the workforce to deploy in response to the loss event.

3. The method of claim 2, wherein comparing the loss event data to the historical data further comprises determining to decrease the workforce, and wherein the method further comprises:

removing, from a workforce schedule, a portion of the workforce.

4. The method of claim 2, wherein comparing the loss event data to the historical data further comprises determining to increase the workforce, and wherein the method further comprises:

adding, to a workforce schedule, at least one additional individual.

5. The method of claim 1, wherein comparing the loss event data to the historical data further comprises determining to decrease the level of the computing resources, and wherein the method further comprises:

scaling down a portion of the computing resources.

6. The method of claim 1, wherein comparing the loss event data to the historical data further comprises determining to increase the level of the computing resources, and wherein the method further comprises:

initiating additional computing resources.

7. A system for modifying resources to manage loss events, comprising:

a communication module adapted to receive loss event data related to a loss event, the loss event data (i) recorded by at least one sensor associated with at least one property and (ii) received in real time during occurrence of the loss event;

a high-speed memory store;

dedicated stream processing hardware comprising a front office cluster and a back office cluster, the dedicated stream processing hardware connected to federated database hardware and configured to:

ingest the loss event data from the front office cluster to the back office cluster, and route the loss event data to the high-speed memory store;

a memory adapted to store historical data of previous loss events; and a processor adapted to interface with the communication module and the memory, wherein the processor is configured to execute non-transitory computer executable instructions stored in the memory to cause the processor to:

perform complex event processing on the loss event data in the high-speed memory store to identify (i) a particular type of the loss event, and (ii) a degree associated with the particular type and indicating an expected amount of damage from the loss event, access at least a portion of the historical data that is associated with the particular type of the loss event and the degree associated with the particular type, the at least the portion of the historical data indicating a level of resources needed to manage at least one previous loss event of the particular type and of the degree, the resources comprising physical parts or supplies and computing resources, compare the loss event data to the at least the portion of the historical data, based on the comparison, determine, (i) in real time as the loss event data is received and (ii) during occurrence of the loss event:

that the loss event data indicates a different amount of damage than that expected by the at least the portion of the historical data, and an anticipated amount of the physical parts or supplies, according to the different amount of damage, needed to manage the loss event, contact a vendor or supplier of the physical parts or supplies to notify the vendor or supplier of the anticipated amount of the physical parts or supplies; and modify a level of the computing resources to employ in managing the loss event.

8. The system of claim 7, wherein the resources further comprise a workforce, and wherein the processor is further configured to:

modify a level of the workforce to deploy in response to the loss event.

9. The system of claim 8, wherein the processor compares the loss event data to the at least the portion of the historical data to further cause the processor to:

determine to decrease the workforce, and remove, from a workforce schedule, a portion of the workforce.

10. The system of claim 8, wherein the processor compares the loss event data to the at least the portion of the historical data to further cause the processor to determine to increase the workforce, and wherein the processor adds, to a workforce schedule, at least one additional individual.

11. The system of claim 7, wherein the processor compares the loss event data to the at least the portion of the historical data to further cause the processor to:

determine to decrease the level of the computing resources, and scale down a portion of the computing resources.

12. The system of claim 7, wherein the processor compares the loss event data to the at least the portion of the historical data to further cause the processor to:

determine to increase the level of the computing resources, and initiate additional computing resources.

\* \* \* \* \*